(12) United States Patent
Shan et al.

(10) Patent No.: US 8,188,973 B2
(45) Date of Patent: May 29, 2012

(54) APPARATUS AND METHOD FOR TRACKING A LIGHT POINTER

(75) Inventors: Jizhang Shan, Cupertino, CA (US); Jin Li, Santa Clara, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 1180 days.

(21) Appl. No.: 11/936,737

(22) Filed: Nov. 7, 2007

(65) Prior Publication Data
US 2009/0115722 A1 May 7, 2009

(51) Int. Cl.
G06F 3/033 (2006.01)
(52) U.S. Cl. ............... 345/157; 345/158; 353/30
(58) Field of Classification Search .......... 345/87, 345/156–158, 169, 173, 180; 353/30, 42, 353/46, 69, 70
See application file for complete search history.

(56) References Cited

U.S. PATENT DOCUMENTS

| | | | |
|---|---|---|---|
| 6,050,690 A | 4/2000 | Shaffer et al. | |
| 6,275,214 B1 | 8/2001 | Hansen | |
| 6,417,840 B1 | 7/2002 | Daniels | |
| 6,765,555 B2 | 7/2004 | Wu | |
| 6,798,926 B2 * | 9/2004 | Hiramatsu | 382/291 |
| 6,802,611 B2 | 10/2004 | Chu et al. | |
| 6,859,199 B2 | 2/2005 | Shi | |
| 6,948,820 B2 | 9/2005 | Veligdan et al. | |
| 7,042,439 B2 | 5/2006 | Luoi | |
| 7,180,510 B2 * | 2/2007 | Inoue et al. | 345/180 |
| 7,520,620 B2 | 4/2009 | Miyasaka | |
| 2001/0045940 A1 * | 11/2001 | Hansen | 345/158 |
| 2002/0089489 A1 * | 7/2002 | Carpenter | 345/158 |
| 2003/0169233 A1 * | 9/2003 | Hansen | 345/158 |
| 2004/0012565 A1 | 1/2004 | Cok | |
| 2004/0165154 A1 | 8/2004 | Kobori et al. | |
| 2006/0007142 A1 | 1/2006 | Wilson et al. | |
| 2006/0170874 A1 | 8/2006 | Yumiki | |
| 2006/0197742 A1 | 9/2006 | Gray | |
| 2006/0197756 A1 | 9/2006 | Sun | |
| 2006/0227107 A1 | 10/2006 | Ho | |
| 2007/0030460 A1 | 2/2007 | Mehrl | |
| 2008/0129704 A1 * | 6/2008 | Pryor | 345/173 |
| 2009/0091710 A1 | 4/2009 | Huebner | |
| 2009/0115971 A1 | 5/2009 | Shan et al. | |
| 2010/0214214 A1 * | 8/2010 | Corson et al. | 345/158 |

FOREIGN PATENT DOCUMENTS

| | | |
|---|---|---|
| JP | 2000276297 | 10/2000 |
| KR | 1020070052160 | 5/2007 |
| WO | 2006085580 A1 | 8/2006 |

OTHER PUBLICATIONS

Select File History from related U.S. Appl. No. 11/936,746, dated Apr. 12, 2010 to Sep. 27, 2010, 32 pages.
International Search Report and Written Opinion issued in related PCT/US2008/080906, dated Mar. 31, 2009, 11 pages.
International Search Report and Written Opinion issued in related PCT Patent Application Serial No. PCT/US2008/080902, issued Jun. 23, 2009, 11 pages.

* cited by examiner

*Primary Examiner* — Kimnhung Nguyen
(74) *Attorney, Agent, or Firm* — Lathrop & Gage LLP

(57) ABSTRACT

A light pointer apparatus has a light source module for projecting a light beam onto a surface. The light pointer apparatus also has an image sensor module and a transmitter module. The image sensor module detects a position in the surface of a visible light spot generated by the projected light beam striking the surface. The transmitter module transmits the position of the visible light spot to a remote device for remote control of a device.

25 Claims, 9 Drawing Sheets

APPARATUS AND METHOD FOR TRACKING A LIGHT POINTER

CROSS-REFERENCE TO RELATED APPLICATIONS

This application is related to the commonly owned patent application entitled "Dual-Mode Projection Apparatus and Method for Locating a Light Spot in a Projected Image," filed the same day as the present application, application Ser. No. 11/936,746, the contents of which are hereby incorporated by reference.

BRIEF DESCRIPTION OF THE INVENTION

This invention relates generally to tracking a light pointer. More particularly, this invention relates to an apparatus and method for tracking a light pointer position to emulate a remote control device.

BACKGROUND OF THE INVENTION

Light pointers are devices that project a light beam onto a surface area to highlight an item of interest. Their use has become commonplace at meetings, lectures, conferences, and other venues where presentation materials are shown on a display screen. The presentation materials are typically projected from a computer onto the display screen using a projection device connected to the computer, such as a liquid crystal projector. A presenter may use a light pointer at any time during the presentation to draw attention to particular locations or items of interest shown on the display screen with a light spot that is visible to the audience.

Most common light pointers are handheld, pen-shaped devices that hold a battery set, a control circuit, a light source module and a lens. The light source module includes a light source, e.g., a laser or Light Emitting Diode ("LED"), for emitting light at a given wavelength, for example wavelengths corresponding to red, green, or blue light.

Light pointers may also include switches or buttons for enabling remote control of basic computer functions. For example, United States Patent Publication Number 2006/0197756 describes a light pointer with switches mounted thereon to enable remote initiation of various computer keyboard commands and/or pointing device (i.e., mouse, touch pad, track ball) operations, such as select, move, left click, right click and double click. The light pointer emits a light beam onto an image projected onto a display screen to produce a visible light spot superimposed on the image. The light spot functions as a control cursor for a presentation computer. A video camera in an image processor connected to the presentation computer is used to scan the image projected onto the screen. The image processor then analyzes the scanned image to identify the position of the control cursor (i.e., light spot) emitted by the light pointer. A user may direct the control cursor to a position in the screen and emulate position-dependent computer commands via the switches.

Light pointers may also include controllers and wireless modules for transmitting control signals to the presentation computer. In United States Patent Publication Number 2006/0227107, for example, a light pointer is provided with a wireless operation module for transmitting control signals to a presentation computer indicating the pressing of a given switch mounted on the light pointer. One switch may be used to transmit a page-up signal to the computer and another may be used to transmit a page-down signal to the computer. The page-up and page-down signals indicate to the computer that a new page of presentation material is to be displayed and projected onto the screen.

Light pointers may also be integrated with other devices. For example, a light pointer may be integrated into a wireless mouse, as described in U.S. Pat. No. 6,417,840. The integrated device is capable of selectively communicating control signals to a computer when operating as a mouse and transmitting a light beam to a projection screen when operating as a light pointer.

In addition, light pointers may be adapted to generate a modulated output that serves as a control signal for a projection system. In United States Patent Publication No. 2007/0030460, a light pointer has a modulated output that is used to provide commands to a projection system. The projection system has an image sensor integrated into it for detecting the position of light spots emitted by the light pointer. In one example, a user may press a button mounted on the light pointer to cause it to pulse at a given frequency. The pulsation indicates to the projection system that the light pointer position is to be monitored for a mouse "dragging" event until the user presses the button again to stop the pulsation. Different frequencies may be used to activate different mouse events.

These and other currently-available light pointers can only function as remote control devices with the use of mechanical buttons or switches. A user must manually operate the switches to control the presentation computer. This may be cumbersome and difficult to perform in practice as the user must change focus from giving the presentation to operating the switches. The switches may also be prone to error or fail entirely during a presentation.

Accordingly, it would be desirable to provide a light pointer apparatus that is capable of emulating a remote control device such as a wireless mouse without the use of manual switches. In particular, it would be desirable to provide a light pointer apparatus and method for tracking the position of a light pointer and using the position to control a presentation computer.

SUMMARY OF THE INVENTION

A light pointer apparatus has a light source module for projecting a light beam onto a surface. An image sensor module detects a position in the surface of a visible light spot generated by the projected light beam striking the surface. A transmitter module transmits the position of the visible light spot to a remote device for remote control of a device.

An embodiment of the invention includes an image sensor apparatus for use in a light pointer projecting a light beam onto a surface. An image sensor module detects a position in the surface of a visible light spot generated by the projected light beam striking the surface. A transmitter module transmits the position of the visible light spot to a remote device for remote control of a device.

Another embodiment of the invention includes a method for emulating a remote control device with a light pointer. A light beam is projected onto a surface with the light pointer to generate a visible light spot on the surface. A position in the surface corresponding to the visible light spot is detected with an image sensor integrated into the light pointer. The position of the visible light spot is transmitted to a remote device. The remote device is controlled based on the position of the projected light beam.

BRIEF DESCRIPTION OF THE DRAWINGS

The invention is more fully appreciated in connection with the following detailed description taken in conjunction with the accompanying drawings, in which like reference characters refer to like parts throughout, and in which.

DETAILED DESCRIPTION OF THE INVENTION

A light pointer apparatus is provided. As generally used herein, a light pointer may be a device for projecting a light beam onto a surface area to highlight an item of interest. The surface area may be, for example, a display screen showing images projected thereon by a projector connected to a computer generating the images. The light beam may be projected as a visible light spot superimposing the images on the display screen. A light source module is included in the light pointer for emitting the light beam.

The light pointer apparatus also includes an image sensor module having an image sensor and a processor. An image sensor, as generally used herein, may be a device or circuitry having an array of pixels for capturing and processing an optical image into electronic signals. The electronic signals may be processed by the processor to determine a position corresponding to the visible light spot emitted by the light pointer.

Figure 1:
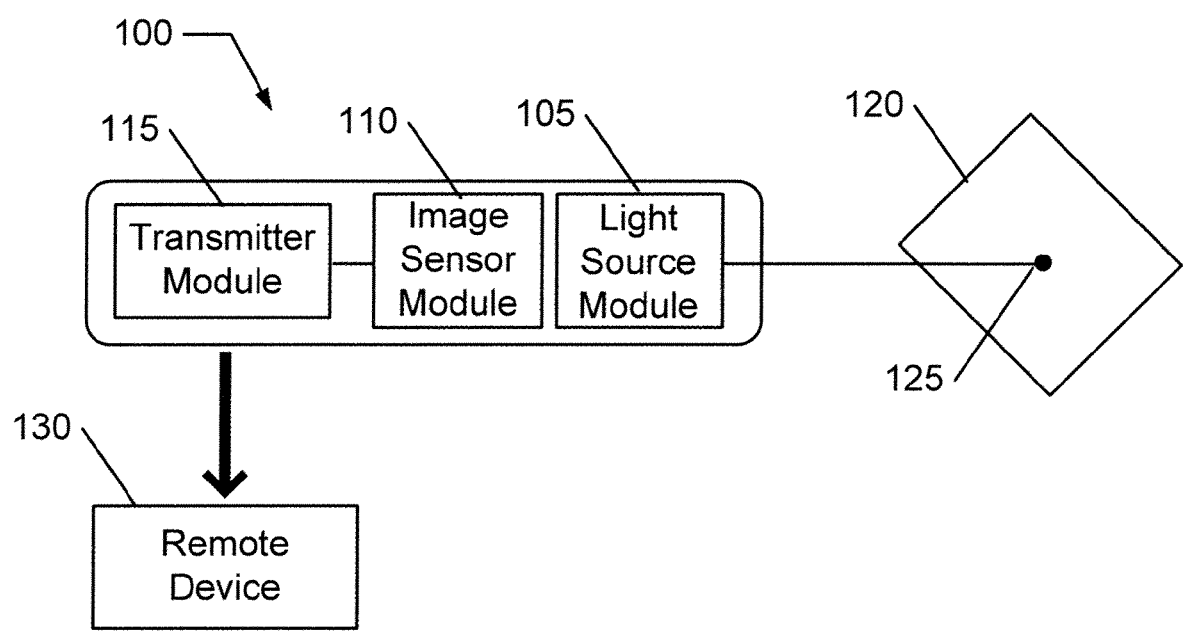
FIG. 1 illustrates a light pointer apparatus constructed according to an embodiment of the invention.

A light pointer apparatus constructed according to an embodiment of the invention is illustrated in FIG. 1. Light pointer 100 has a light source module 105, an image sensor module 110, and a transmitter module 115. Light source module 105 includes a light source, e.g., a laser or Light Emitting Diode ("LED"), for emitting a light beam at a given wavelength, for example, wavelengths corresponding to red, green, or blue light. The light beam may be projected onto a surface, such as surface 120, to produce a visible light spot 125 on the surface 120. The visible light spot 125 can appear in different patterns and shapes, such as a circular block, the shape of a butterfly, the shape of a cursor, and so on.

Light is reflected from surface 120 when light pointer 100, facing surface 120, projects a light beam onto it. The reflected light is sensed by image sensor module 110, which is positioned in light pointer 100 to capture images in the same direction as the light beam. Image sensor module 110 sees the surface 120 and the visible light spot 125 thereon and detects its position. The position of the light spot 125 may be detected automatically or computed by processing and analyzing the captured image.

The position of the light spot 125 is transmitted to remote device 130 by transmitter module 115. Transmitter module 115 may be any wireless transmitter capable of interfacing with image sensor module 110, such as a WiFi or Bluetooth wireless transmitter. The position transmitted to remote device 130 may be a 2D (x,y) coordinate with a corner of surface 120 serving as the reference (0,0) point. Alternatively, the position may be a displacement between the current position and a previous position, with the initial position determined when light pointer 100 is first powered up.

A power ON/OFF button or switch (not shown) is included in light pointer 100 for powering it up. It is appreciated that the power switch may be the only switch included in light pointer 100. It is also appreciated that transmitter module 115 may also be used to transmit the image captured by the image sensor module 110 to remote device 130.

Remote device 130 receives the position of the light spot from transmitter module 115 and uses the position to control one or more of its functions. It is appreciated that remote device 130 may have a receiver module (not shown) capable of receiving signals wirelessly from transmitter module 115. It is also appreciated that remote device 130 may include control routines for controlling the one or more of its functions based on the position of light spot 125.

In one exemplary embodiment, remote device 130 may be a computer generating images for display at surface 120, which may be a display screen for displaying images for an audience, e.g., during a presentation. Light pointer 100 may be used to send commands to computer 130 depending on the position of the light spot in the display screen.

In this exemplary embodiment, remote computer 130 may have a calibration routine to scale the position on surface 120 to a position on the image displayed on surface 120. For example, the light spot 125 may be positioned to superimpose a region of the images to indicate to computer 130 that a new image or slide of the presentation is to be displayed, such as an icon on the images indicating an image or page number of the presentation. The position of the light spot 125 on surface 120 is determined with 2D coordinates at the scale of surface 120. Upon receiving the position of light spot 125, remote device 130 maps the received position into 2D coordinates at the scale of the image displayed on surface 120.

It is appreciated that remote computer 130 may have a pre-determined mapping from display screens into presentation images. It is also appreciated that remote computer 130 may determine the mapping upon projecting the images onto the display screen.

Alternatively, light pointer 100 may also be moved continuously across display screen 120 to indicate to computer 130 that a new image or slide is to be displayed. Positioning the light spot 125 on the icon or moving the light pointer 100 continuously has the same effect as clicking a button on a mouse associated with computer 130 to go to the next slide. In this exemplary embodiment, light pointer 100 effectively operates as a wireless mouse associated with computer 130.

In another exemplary embodiment, remote device 130 may be a toy or a game. Light pointer 100 may be used as a remote control for the toy or game by positioning the light spot according to a desired command. For example, the toy 130 may be a remote control car and the light pointer 100 may be used to guide the remote control car to a given location. When the position of the light spot 125 is transmitted to the car by transmitter module 115, the car is directed to move to that position.

In yet another exemplary embodiment, remote device 130 may be an electronic appliance, for example, remote device 130 may be a vacuum cleaner. Light pointer 100 may be used as a remote control for the vacuum cleaner by positioning the light spot 125 on a surface to be cleaned. When the position of the light spot 125 is transmitted to the vacuum cleaner by transmitter module 115, the vacuum cleaner is directed to the surface to clean it.

In a further exemplary embodiment, remote device 130 may be a controller connected to a network of appliances. Light pointer 100 may be used as a remote control for the appliances by positioning the light spot 125 directly on a button of the appliance, e.g., the power button. When the image sensor module 110 detects that the light spot 125 is on the power button and its position is transmitted to controller 130, controller 130 may send a signal to the appliance to turn it ON or OFF.

It is appreciated that these exemplary embodiments are given for purposes of illustration only and additional exemplary embodiments are within the scope of the invention. It is also appreciated that remote device 130 may include control routines to control one or more of its functions based on the position of the light spot according to each exemplary embodiment. It is also appreciated that remote device 130 may use the position of light spot 125 to control another device connected to remote device 130, such as, for example, in the exemplary embodiment of the controller described above.

It is further appreciated that remote device 130 may include training and adaptation routines to interpret different positions of light spots generated by light pointer 100 as different commands. For example, remote device 130 may interpret a position on the upper left corner of surface 120 to correspond to a page down command, a position on the lower left corner of surface 120 to correspond to a page up command, a position on the upper right corner of surface 120 to correspond to an animation command, and so on.

Figure 2:
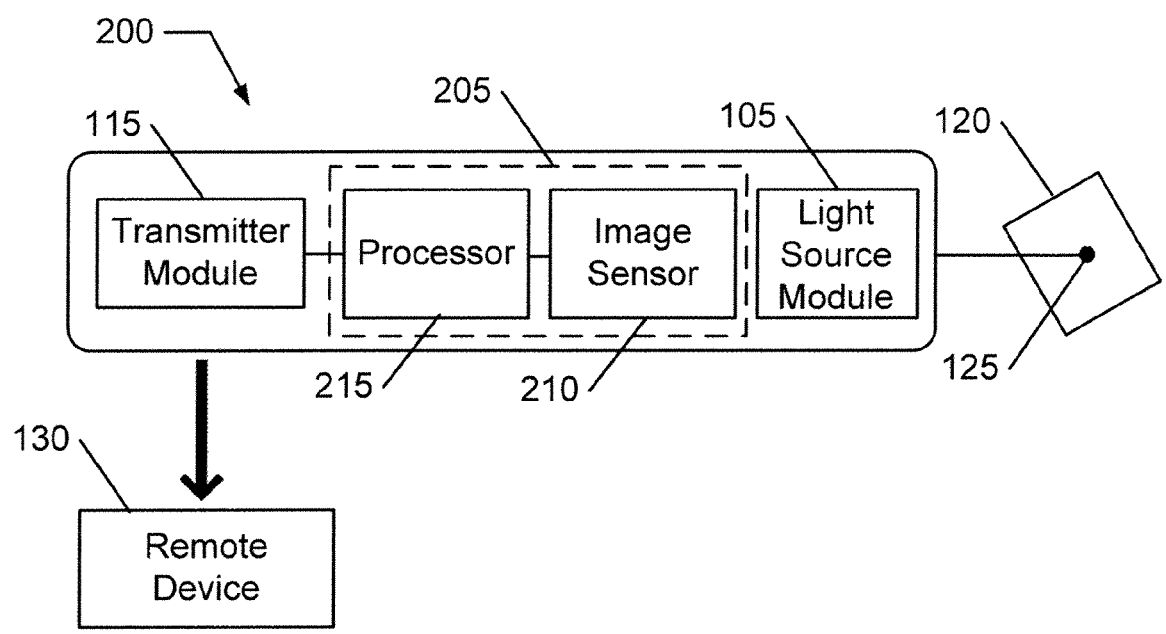
FIG. 2 illustrates a more detailed view of the light pointer apparatus of FIG. 1.

FIG. 2 illustrates a more detailed view of a light pointer apparatus constructed according to an embodiment of the invention. Image sensor module 205 in light pointer 200 includes image sensor 210 and processor 215. Image sensor 210 and processor 215 as shown may be mounted on separate chips. Image sensor 210 may be a CMOS or CCD image sensor, or any other type of image sensor capable of capturing optical images. Processor 215 may be a Digital Signal Processor ("DSP"), an Image Signal Processor ("ISP"), or any other kind of processor capable of interfacing with image sensor 210.

In one exemplary embodiment, image sensor 210 captures an image of the surface 120 with light spot 125 and transmits the image to processor 215 for analysis and processing. Processor 215 may then execute image processing routines to detect and locate the light spot 125 on the captured image. As described above, the 2D coordinates or displacement of the light spot 125 on surface 120 can be computed by processor 215 for use in remote device 130 for remote control of remote device 130.

Figure 3:
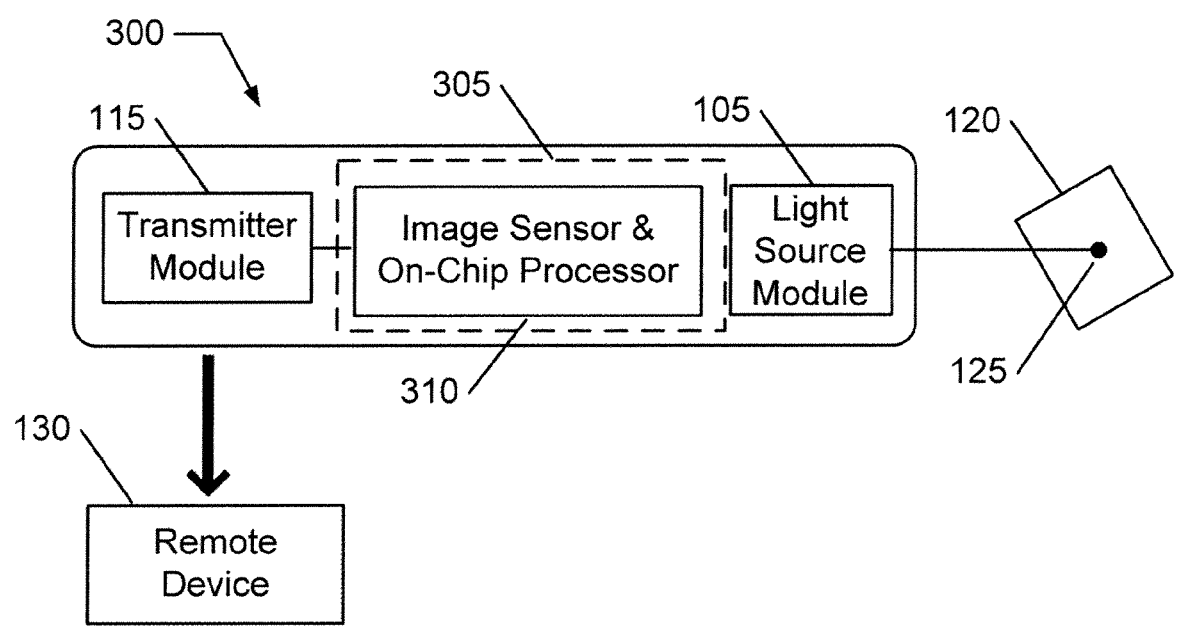
FIG. 3 illustrates a further detailed view of the light pointer apparatus of FIG. 1.

Another detailed view of a light pointer apparatus constructed according to an embodiment of the invention is illustrated in FIG. 3. Image sensor module 305 in light pointer 300 includes integrated image sensor/processor chip 310. Integrated chip 310 has both an image sensor and a processor on the same chip. The image sensor may be similar to image sensor 210 and the processor may be similar to processor 215, both shown in FIG. 2. In this exemplary embodiment, a single integrated chip 310 is used to both capture an image showing the light spot 125 and to detect the position of the light spot 125 in the captured image.

Figure 4:
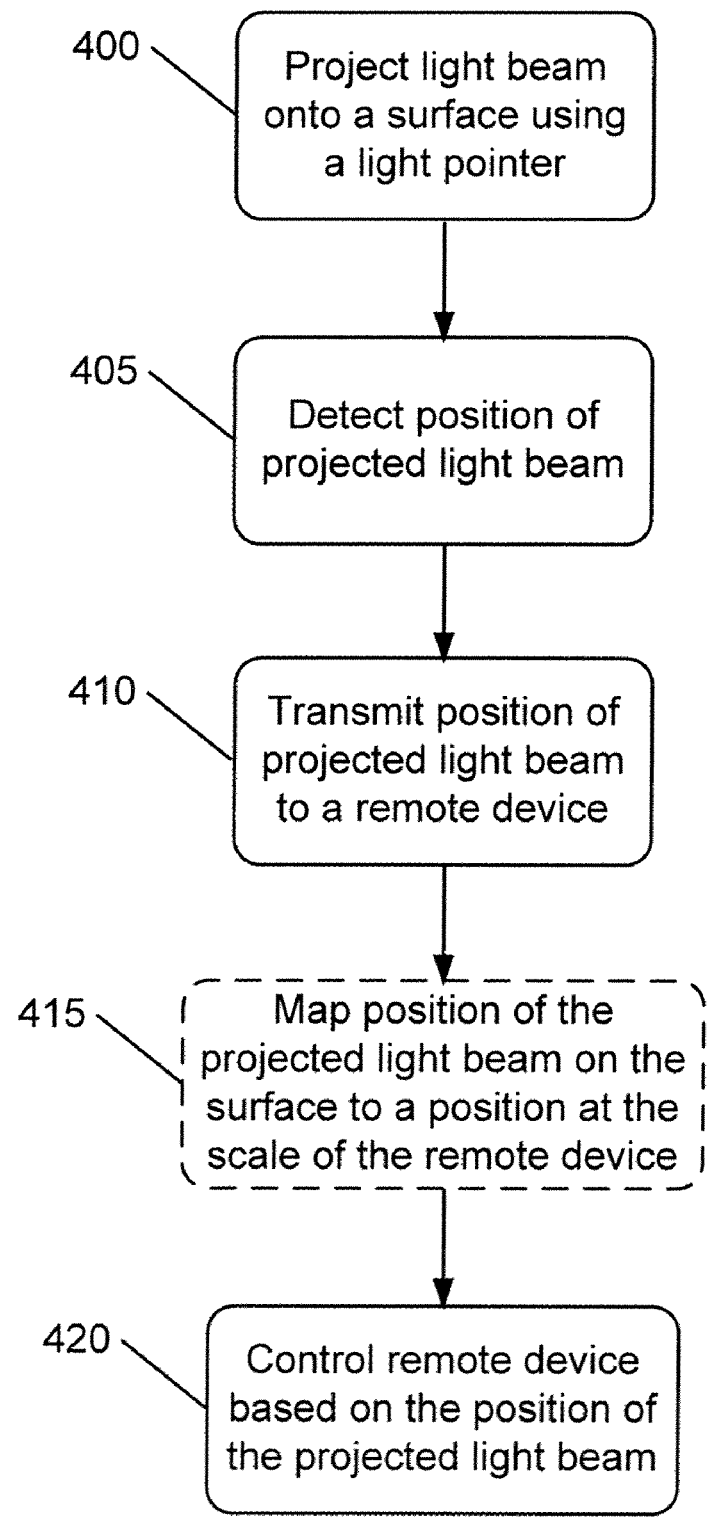
FIG. 4 illustrates a flow chart for emulating a remote control device with a light pointer apparatus in accordance with an embodiment of the invention.

Referring now to FIG. 4, a flow chart for emulating a remote control device with a light pointer apparatus in accordance with an embodiment of the invention is described. A light pointer apparatus may be used to project a light beam onto a surface and generate a light spot visible on the surface in step 400. The position of the light spot may be detected by an image sensor module in the light pointer in step 405 and transmitted to a remote device by a transmitter module in the light pointer in step 410. Optionally, depending on the remote device, the position of the light spot in the surface may be mapped into a position at the scale of the remote device in step 415. The position of the light spot is then used to control the remote device as described above with reference to FIG. 1 in step 420.

Figure 5:
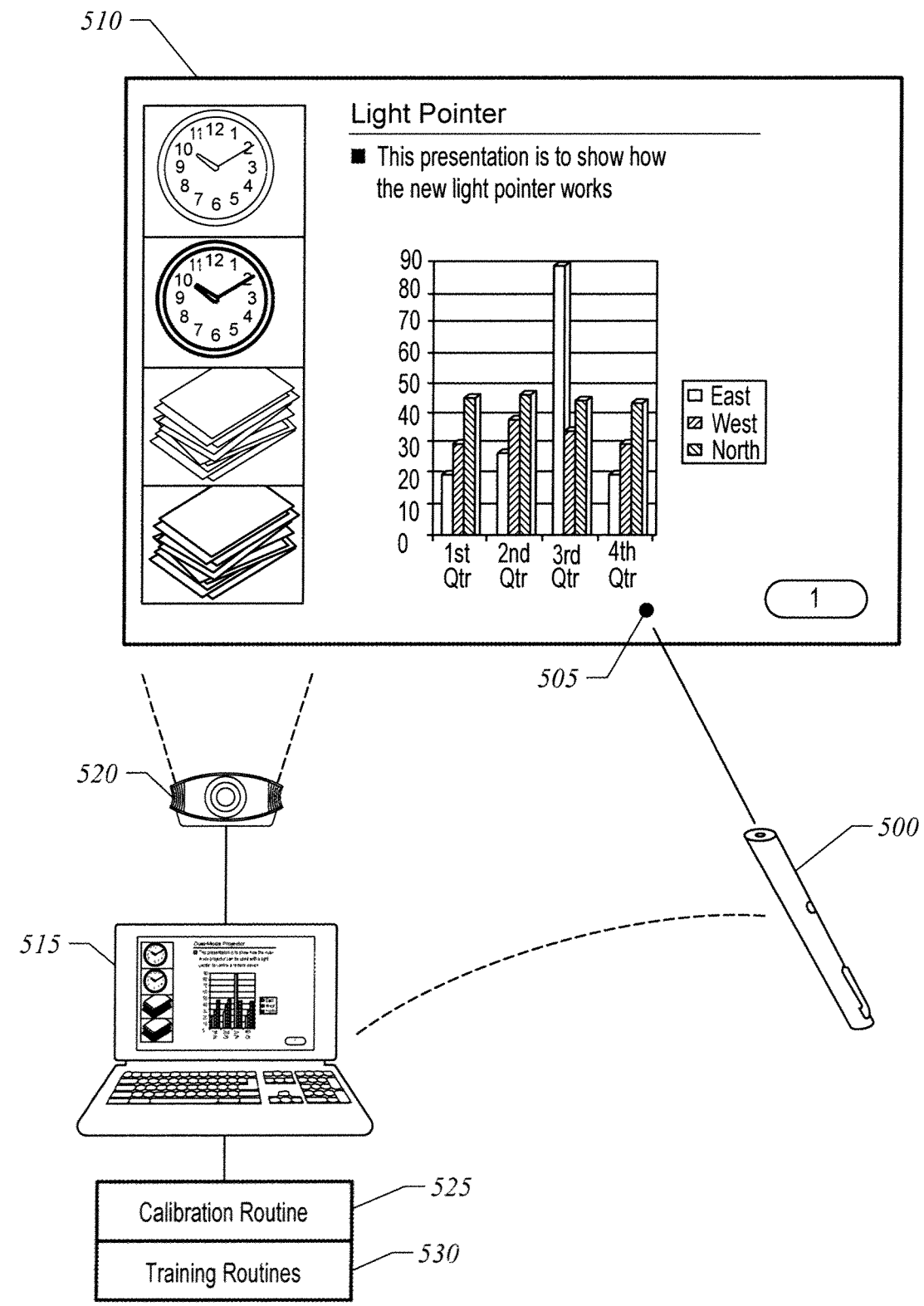
FIG. 5 illustrates an exemplary environment in which the light pointer apparatus operates in accordance with an embodiment of the invention.

An exemplary environment in which the light pointer apparatus operates in accordance with an embodiment of the invention is illustrated in FIG. 5. Light pointer 500 may be used to project a light beam into light spot 505 visible on surface 510. Surface 510 may be a display screen to display images generated by remote computer 515 during a presentation. A projector 520 connected to remote computer 515 may be used to project the images onto display screen 510.

According to an embodiment of the invention, an image sensor module in light pointer 500 sees the image displayed on display screen 510 and the light spot 505 superimposed on the image. A processor in the image sensor module in light pointer 500 processes the captured image to detect and locate the position of light spot 505. As described above, the position may be a 2D coordinate or a displacement in the display screen 510.

The position of light spot 505 is wirelessly transmitted to remote computer 515 by a transmitter module in light pointer 500. The remote computer 515 may use the position to control one or more of its functions. For example, the remote computer 515 may use the position of light spot 505 to direct an operation to be performed on the presentation, e.g., to go to a previous or next image of the presentation, to start an animation, to superimpose another image on top of the current slide, and so on.

It is appreciated that remote computer 515 may have a calibration routine 525 to map the position of light spot 505 on display screen 510 into a position at the scale of the image displayed on display screen 510. For example, a 2D coordinate $(x_1, y_1)$ in the display screen 510 may correspond to a 2D coordinate $(x_2, y_2)$ in the image being displayed. It is also appreciated that remote computer 515 may have a training and adaptation routine 530 to interpret different positions of light spots generated by light pointer 500 as different commands as described above.

Figure 6:
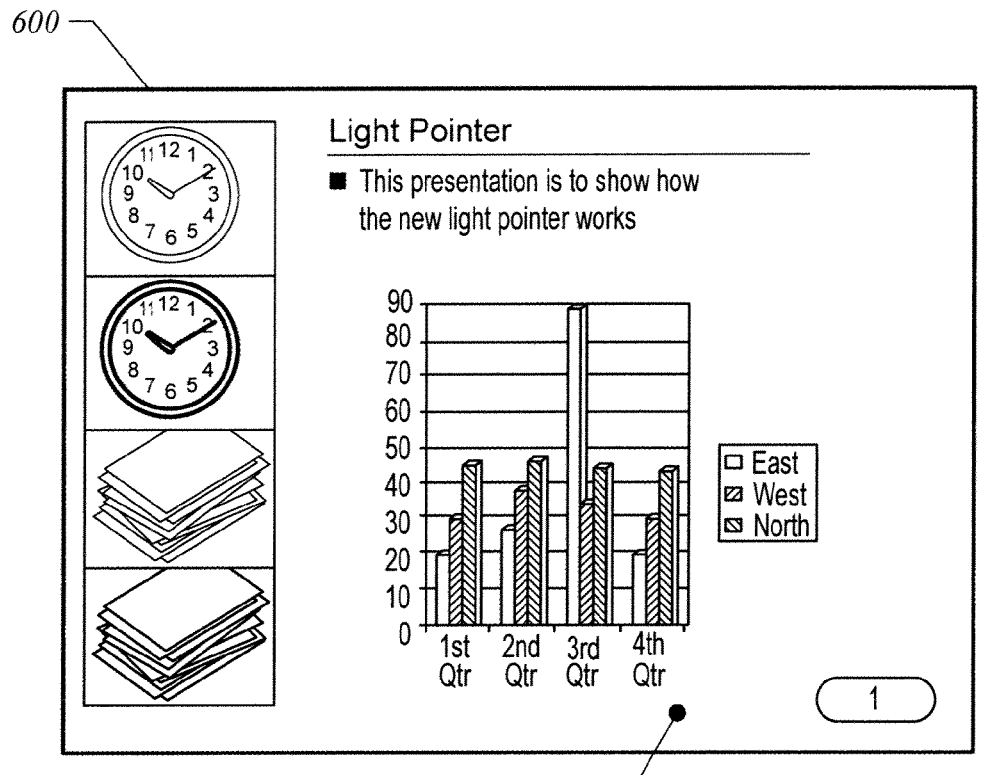
FIG. 6 illustrates exemplary images detected by the light pointer apparatus in the exemplary environment of FIG. 5 in accordance with an embodiment of the invention.
Figure 6:
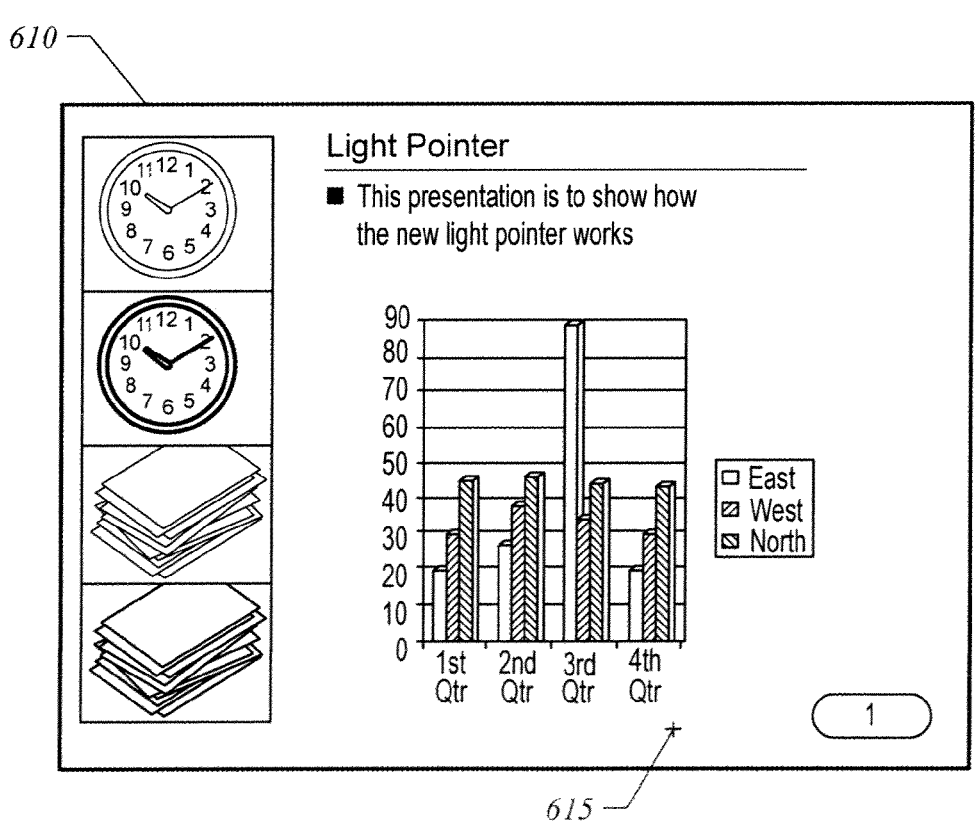

FIG. 6 shows exemplary images captured and processed by light pointer 500 shown in FIG. 5. Image 600 shows the optical image that the image sensor in the image sensor module of light pointer 500 sees when light pointer 500 is projecting light spot 505 onto display screen 510. The light spot 505 may be seen by the image sensor as a region 605, which may be a colorful region in the screen that appears different from its neighborhood. For example, light spot 505 may appear as a monochromatic (e.g., red, green, or blue), typically nearly round region 605 at a given diameter and luminance. A processor in the image sensor module of light pointer 500 processes the image 600 to detect and locate a 2D coordinate or displacement for the light spot 505. The processed image 610 may include a marking such as cross 615 to indicate the position of the light spot 505.

It is appreciated that the processor in the image sensor module of light pointer 500 may include image processing routines for identifying region 605 as light spot 505 and for computing the 2D coordinate or displacement of the light spot 505. These routines may include, for example, object and pattern recognition routines, edge detection routines, and other computer vision and image processing routines for differentiating the region 605 as light spot 505 from the rest of the image and locating its position.

Figure 7:
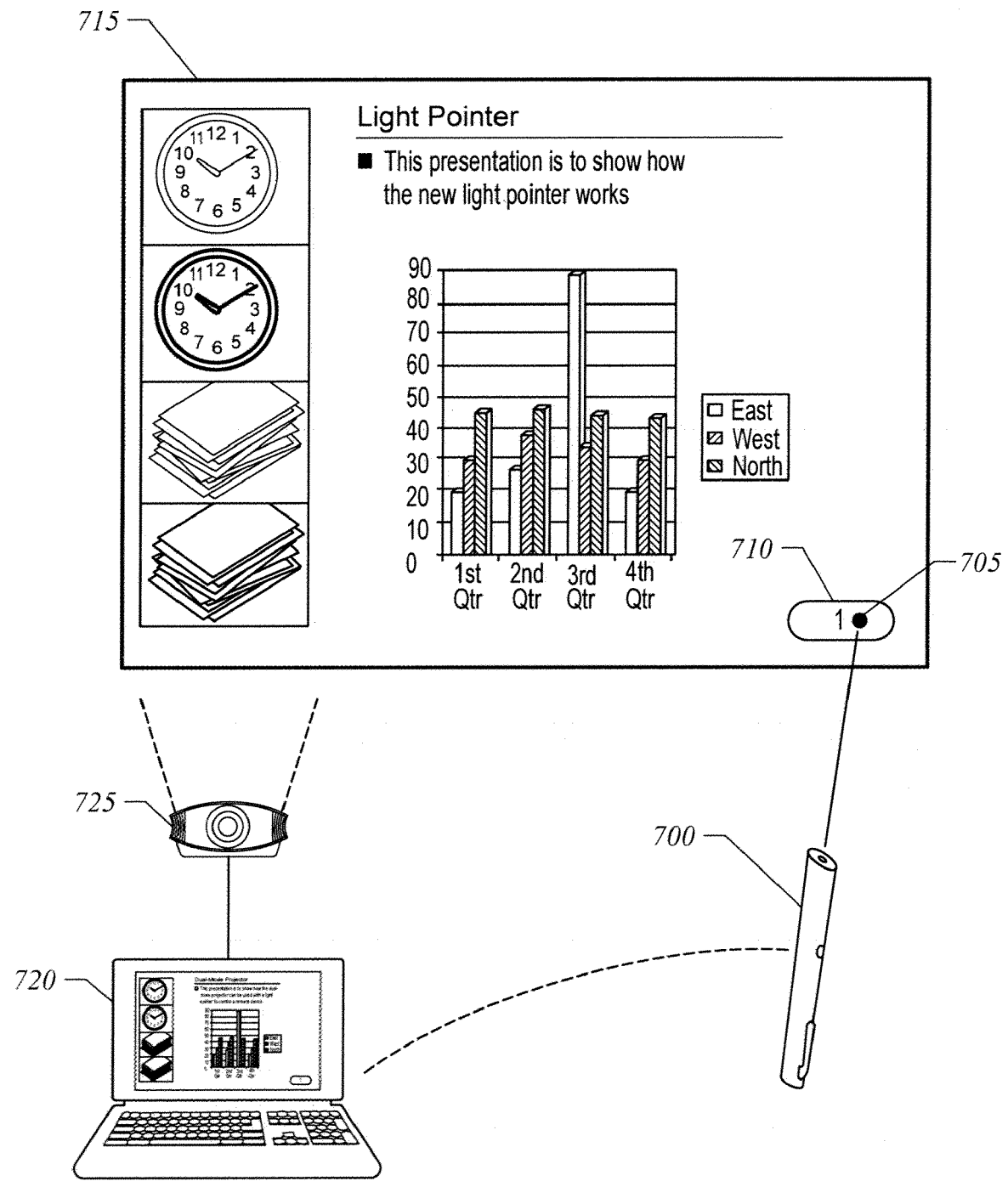
FIG. 7 illustrates another exemplary environment in which the light pointer apparatus operates in accordance with an embodiment of the invention.

Another exemplary embodiment in which the light pointer apparatus operates in accordance with an embodiment of the invention is shown in FIG. 7. Light pointer 700 may be used as a remote control for remote computer 720. Light pointer 700 may be used to project a light beam into light spot 705 that, for example, superimposes icon 710 on the image displayed on display screen 715 during a presentation. Projector 725 connected to remote computer 720 may be used to project images from the presentation into display screen 715.

An image sensor module in light pointer 700 sees the image displayed on display screen 715 with the light spot 705 superimposed onto icon 710 and detects the position of light spot 705. A transmitter module in light pointer 700 transmits the position to remote computer 720. When remote computer 720 receives the position of light spot 705 and determines with a calibration routine that the light spot 705 is within icon 710, remote computer 720 automatically displays the next image of the presentation for projection onto display screen 715 by projector 725.

Figure 8:
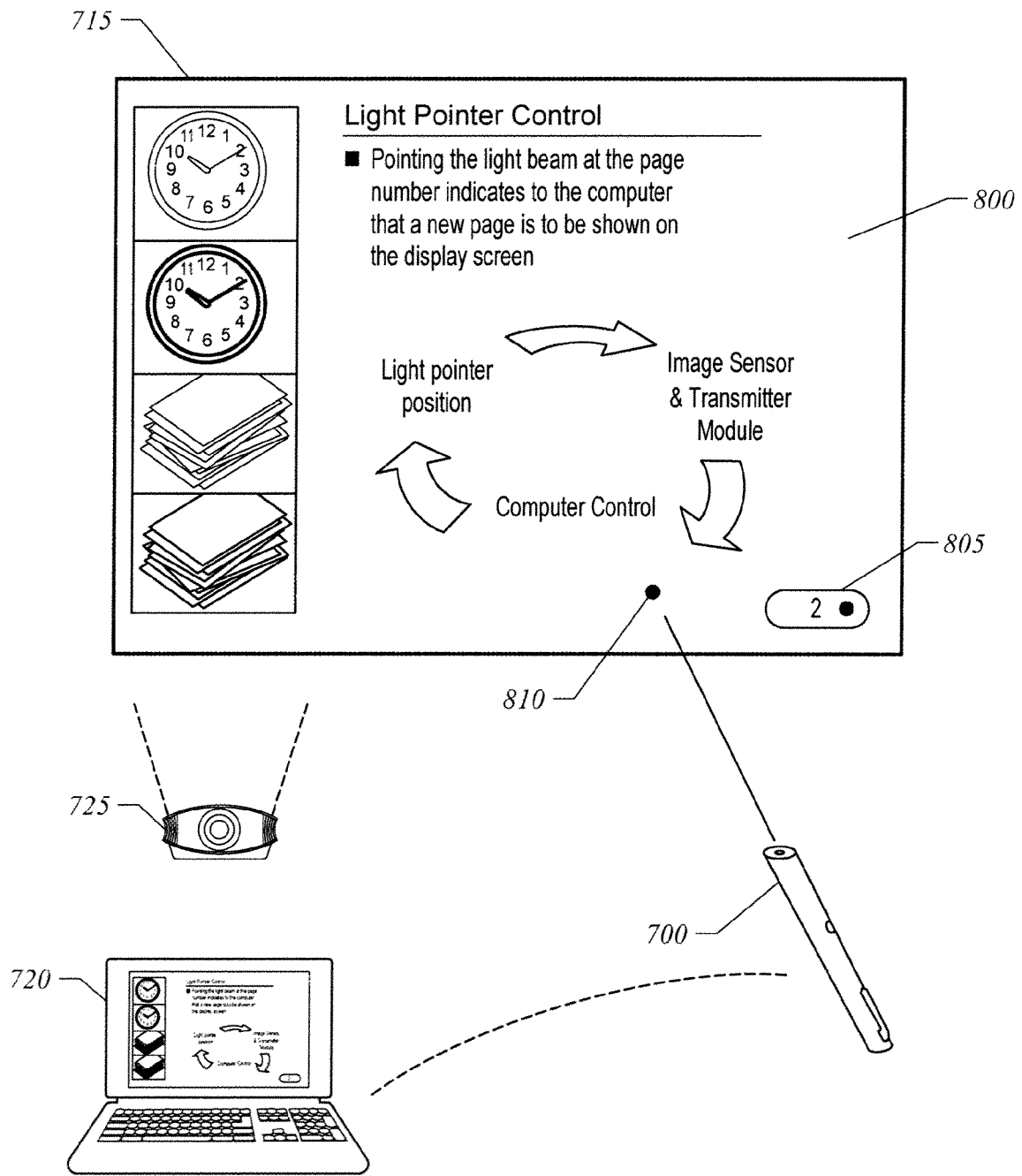
FIG. 8 illustrates a remote device being controlled by the light pointer apparatus in the exemplary environment of FIG. 7 in accordance with an embodiment of the invention.

FIG. 8 illustrates the response of remote computer 720 when controlled by light pointer 700 shown in FIG. 7. Upon receiving the position of light spot 705 on icon 710 indicating that a new image is to be displayed for presentation onto display screen 715, remote computer 720 advances to the next image of the presentation. The next image is then projected onto display screen 715 by projector 725 as image 800.

Image 800 includes page icon 805 indicating the new page number 2 of the presentation displayed onto display screen 715. A presenter may then use light pointer 700 to highlight items of interest on image 800, such as by pointing light pointer 700 to display screen 715 to generate light spot 810.

It is appreciated that light pointer 700 operates as a wireless mouse for remote computer 720. It is also appreciated that remote computer 720 may include routines for interpreting the position of light spots generated by light pointer 700 to correspond to different mouse operations, such as select, right click, left click, drag, and so on.

Figure 9:
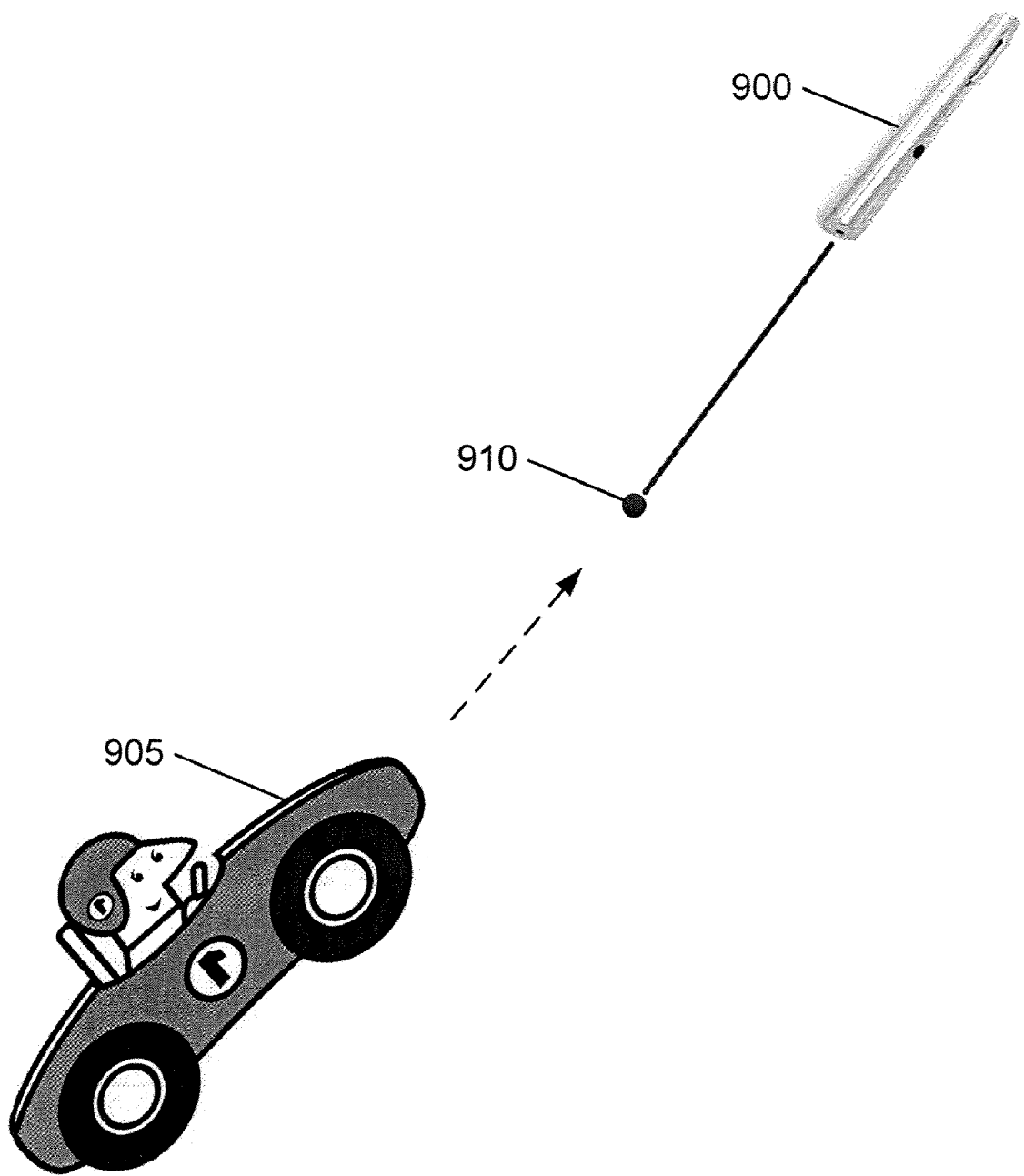
FIG. 9 illustrates a further exemplary embodiment in which the light pointer apparatus operates in accordance with an embodiment of the invention.

Another exemplary embodiment in which the light pointer apparatus operates in accordance with an embodiment of the invention is shown in FIG. 9. In this exemplary embodiment, light pointer 900 is used as a remote control for remote control toy car 905. Remote control car 905 is directed to move to different positions by light pointer 900.

For example, light pointer 900 may be used to project a light beam into light spot 910. The position of light spot 910 is detected by the image sensor module in light pointer 900 and transmitted to remote control car 905 by the transmitter module in light pointer 900. Remote control car 905 is then directed to move to the position corresponding to light spot 910.

It is appreciated that remote control car 905 is shown for illustration purposes only. Other remote devices may be controlled by the light pointer apparatus without deviating from the scope and principles of the invention.

Advantageously, the light pointer apparatus enables a user to control a device remotely by simply pointing the light pointer apparatus to a desired position. This enables the light pointer apparatus to operate as both a light pointer and a wireless mouse without the use of any buttons or switches to trigger different mouse commands.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. It is intended that the following claims and their equivalents define the scope of the invention.

What is claimed is:

1. A light pointer apparatus, comprising:
    a light source module for projecting a light beam onto a surface;
    an image sensor module for detecting a position on the surface of a visible light spot generated by the projected light beam striking the surface; and
    a wireless transmitter module for wirelessly transmitting the position of the visible light spot on the surface to a remote device, wherein each of the light source module, image sensor module and the transmitter module is integrated into the light pointer apparatus.

2. The light pointer apparatus of claim 1, wherein the image sensor module comprises an image sensor and a processor.

3. The light pointer apparatus of claim 2, wherein the position is determined by the processor.

4. The light pointer apparatus of claim 2, wherein the image sensor and the processor are mounted on separate chips.

5. The light pointer apparatus of claim 2, wherein the image sensor and the processor are integrated into a single chip.

6. The light pointer apparatus of claim 1, wherein the light source module comprises a light source selected from the list comprising: a laser; and a light emitting diode.

7. The light pointer apparatus of claim 1, wherein the position comprises a displacement position.

8. The light pointer apparatus of claim 7, wherein the displacement position is determined with reference to a reference point in the surface.

9. The light pointer apparatus of claim 7, wherein the displacement position is determined with reference to a previous position of the projected light beam.

10. The light pointer apparatus of claim 1, wherein the surface comprises a display screen.

11. The light pointer apparatus of claim 10, wherein the remote device comprises a computer generating images for display onto the display screen.

12. The light pointer apparatus of claim 11, wherein the computer comprises a calibration routine and a training routine.

13. The light pointer apparatus of claim 1, wherein the wireless transmission of the position to the remote device enables remote control of the remote device by the light pointer apparatus.

14. An image sensor apparatus for use in a light pointer projecting a light beam onto a surface, comprising:
    an image sensor module for detecting a position on the surface of a visible light spot generated by the projected light beam striking the surface; and
    a wireless transmitter module for wirelessly transmitting the position of the visible light spot to a remote device for remote control of the device, wherein each of the image sensor module and the transmitter module is integrated into the light pointer.

15. The image sensor apparatus of claim 14, wherein the surface comprises a display screen.

16. The image sensor apparatus of claim 15, wherein the light beam is projected to superimpose an image projected onto the display screen.

17. The image sensor apparatus of claim 14, wherein the image sensor module comprises an image sensor and a processor.

18. The image sensor apparatus of claim 17, wherein the processor is configured to determine the position of the projected light beam.

19. The image sensor apparatus of claim 17, wherein the image sensor and the processor are mounted on separate chips.

20. The image sensor apparatus of claim 17, wherein the image sensor and the processor are integrated in a single chip.

21. A method for emulating a remote control device with a light pointer, comprising:

projecting a light beam onto a surface with the light pointer to generate a visible light spot on the surface;

detecting a position on the surface corresponding to the visible light spot with an image sensor integrated into the light pointer;

wirelessly transmitting the position of the visible light spot to a remote device with a transmitter module integrated into the light pointer; and controlling the remote device based on the position of the visible light spot.

22. The method of claim 21, wherein detecting a position in the surface comprises detecting a two-dimensional coordinate and a displacement position.

23. The method of claim 21, further comprising displaying an image onto the surface.

24. The method of claim 23, further comprising mapping the position of the visible light spot to a position in the image.

25. The method of claim 23, wherein controlling the remote device comprises controlling the display of the image onto the surface.

* * * * *